R. DICKINSON.
INDICATOR FOR AUTOMOBILES.
APPLICATION FILED OCT. 16, 1912.
1,104,171.
Patented July 21, 1914.
2 SHEETS—SHEET 1.
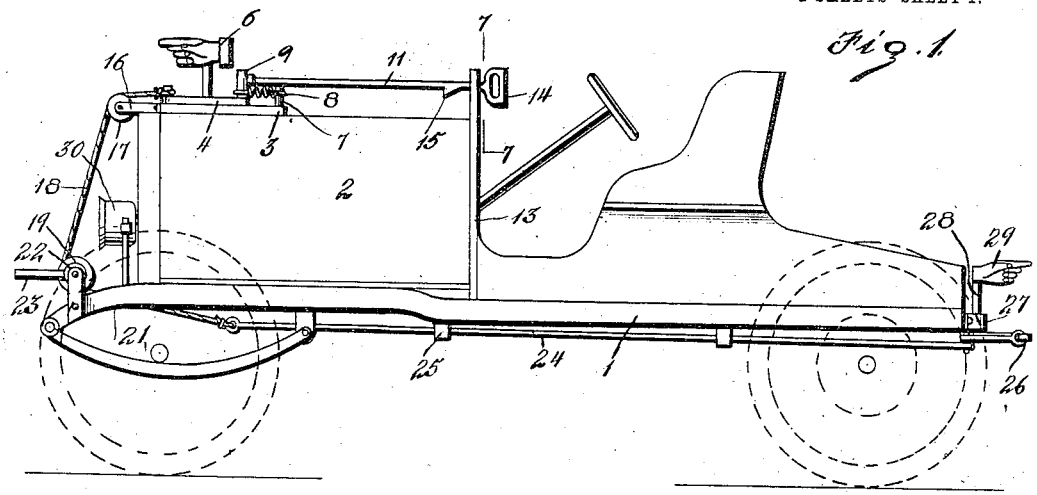
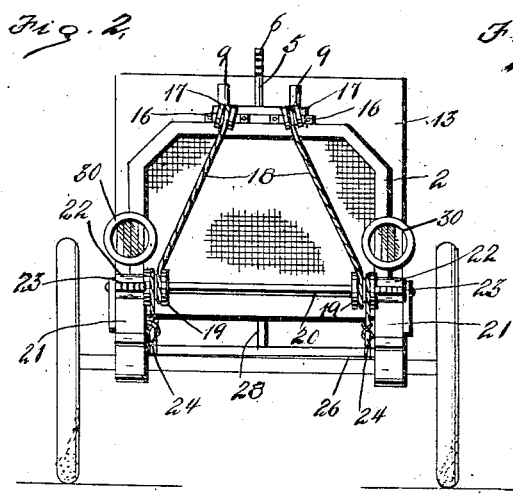
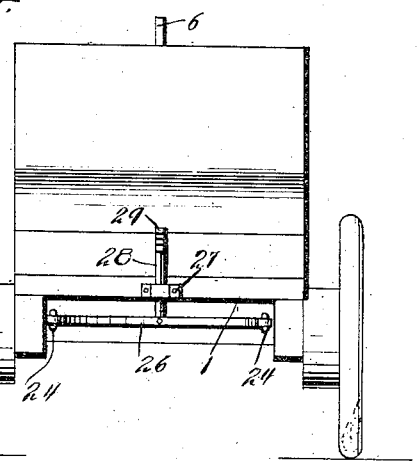
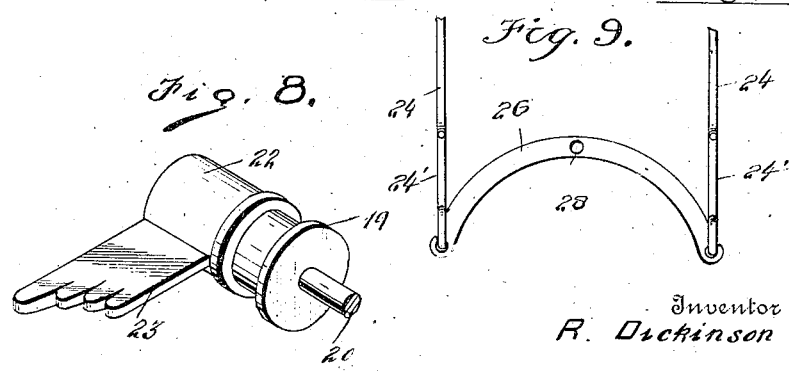
Witnesses
Inventor
R. Dickinson
By
Attorneys R. DICKINSON.
INDICATOR FOR AUTOMOBILES.
APPLICATION FILED OCT. 16, 1912.
1,104,171.
Patented July 21, 1914.
2 SHEETS—SHEET 2.
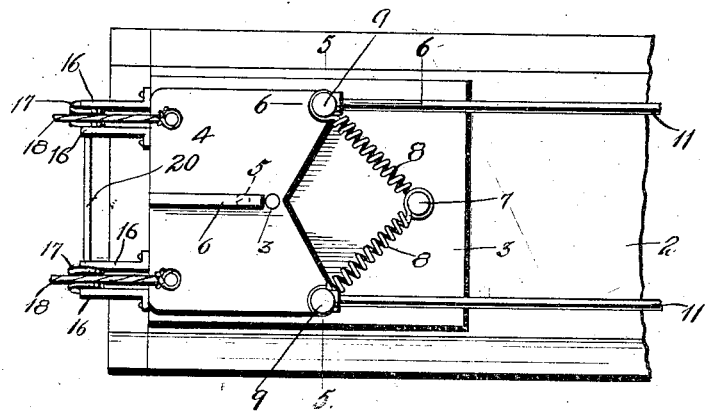
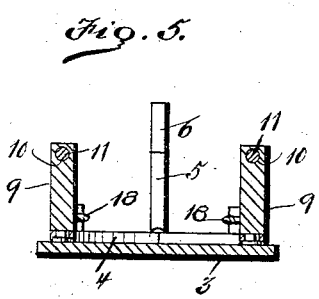
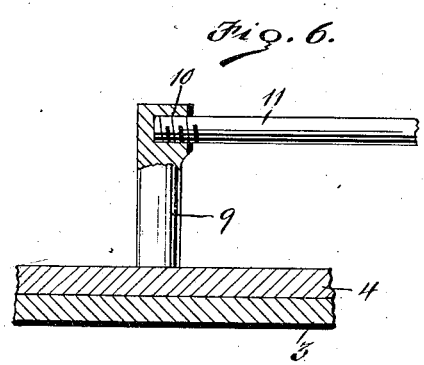
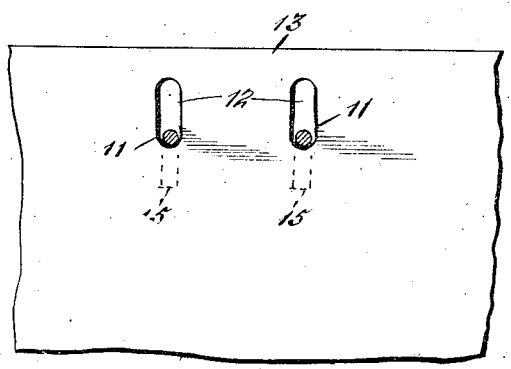
Witnesses
Inventor
R. Dickinson
By Chandler & Chandler
Attorneys

UNITED STATES PATENT OFFICE.

ROBERT DICKINSON, OF VICTORIA, BRITISH COLUMBIA, CANADA.

INDICATOR FOR AUTOMOBILES.

1,104,171.  Specification of Letters Patent.  Patented July 21, 1914.

Application filed October 16, 1912. Serial No. 726,168.

*To all whom it may concern:*

Be it known that I, ROBERT DICKINSON, a subject of the King of England, residing at Victoria, in the Province of British Columbia, Dominion of Canada, have invented certain new and useful Improvements in Indicators for Automobiles; and I do hereby declare the following to be a full, clear, and exact description of the invention, such as will enable others skilled in the art to which it appertains to make and use the same.

This invention is directed to improvements in devices for indicating the direction in which the driver of an automobile is going to turn, and has for its object to provide a device of this character which may be conveniently operated from the driver's seat to indicate both at the front and rear of the machine the direction in which the same is about to travel.

A further object of the invention is to construct a device of this character that the indicator will be visible at night.

A still further object of the invention is to provide a visible indicator of this type which will indicate to pedestrians the proposed travel of an automobile.

With these and other objects in view, this invention resides in the novel features of construction, formation, combinations and arrangements of parts to be hereinafter more fully described, claimed and illustrated in the accompanying drawings, in which:—

Figure 1 is a side elevation of an automobile equipped with the device. Fig. 2 is a front elevation. Fig. 3 is a fragmentary plan view of a vehicle showing the device in place thereon. Fig. 4 is a rear elevation of the machine showing the rear indicator. Fig. 5 is a sectional view on line 5—5 of Fig. 3. Fig. 6 is a similar view on line 6—6 of Fig. 3. Fig. 7 is a similar view on line 7—7 of Fig. 1. Fig. 8 is a detail perspective view of one of the drums. Fig. 9 is a plan view of the bow.

Referring to the drawings, the numeral 1 designates the chassis of an automobile having supported thereon the usual hood 2. Mounted upon the top of the hood 2 is a plate 3, said plate being secured to the hood in any suitable manner, and is provided with a pivot pin 3'. Mounted upon the pin 3' is a segmental plate 4 having rigidly connected thereto a post 5, and to the upper end of which is connected an indicator 6, said indicator being preferably in the form of a human hand.

A lug 7 is secured to the plate 3 and has secured thereto the inner ends of coil spring 8, the outer ends of which are connected to the plate 4 and are so regulated that the indicator 6 will be held in its neutral position. Pivotally connected to the plate 4 and near the inner edge thereof are pins 9, the upper ends of which are formed with horizontally disposed threaded sockets 10. Threaded in said socket 10 is the outer end of a rod 11, the inner ends of which are passed through slots 12 formed in the dash board 13 of the vehicle. The extreme inner ends of the rod terminate in handles 14 which are positioned in convenient reach of the driver of the machine so that either one of said rods may be operated to oscillate the plate 4. Formed near the inner ends of the plates are tapered enlargements 15 which are adapted to pass through the slots 12 and to engage upon the inner face of the dash board to hold the rods in their shifted positions.

Mounted upon the front edge of the hood 2 are spaced brackets 16 which support grooved pulleys 17, and over which pass cords 18, the upper ends of which are secured at spaced points upon the forward edge of the plate 4. The cords pass downwardly in front of the radiator of the automobile and are wound around the drums 19, said drums being loosely mounted upon the shaft 20, the opposite ends of which being suitably secured to the forward ends of the usual springs 21.

Each drum 19 is provided with an extension 22, and upon which is mounted an indicator 23, said indicator being formed in a manner similar to the indicator 6 herein before mentioned.

The lower ends of the cords 18 extend rearwardly under the engine of the machine for a short distance, and are connected to rods 24, which extend longitudinally below the body of the vehicle, suitable brackets 25 being for the purpose of guiding the said rods. The extreme rear ends of the rods 24 are pivotally connected to the ends of a bow 26 by the links 24', said bow being pivotally connected at its center to a bracket 27 secured to the rear of the body of the machine. Extending upwardly from the central portion of the bow 26 is a shaft 28, upon the upper end of which is fixed an indicator 29, said indicator being the same configuration as those hereinbefore mentioned. The indicator 29 is particularly employed for indicating to a following automobile in which direction the machine is about to turn or travel.

When the automobile is traveling in a straight line the indicators 23 remain in a horizontal position, but when the machine is about to turn, and one of the rods is operated so as to shift the plate 4, one of the indicators will swing upwardly and in the path of the rays of light from one of the lamps 30. Assuming that the machine is about to turn to the right, the indicator on the right hand side of the machine is operated so as to dim the lamp on the right of the machine, thus indicating to a pedestrian that the machine is about to turn to the right, it being of course understood that the operation is reversed, when the machine is going to turn to the left.

It is not thought that further description of the device is necessary as the operation and advantages of the same will be apparent taken in connection with the accompanying drawings and description.

What is claimed is:—

1. In combination with an automobile and its chassis, of a shaft rotatably mounted upon the forward end of the chassis, drums loosely carried by said shaft, a plate pivotally mounted upon the hood of the automobile, cords connected to the plate and wound upon said drums, indicators fixed to the drums, rods having their outer ends pivoted to the plate, whereby when one of said rods is reciprocated said plate will be partially rotated, to rotate the shaft and actuate one of the indicators, as and for the purpose set forth.

2. In combination with an automobile and its chassis, of a shaft journaled upon the forward end of the chassis drums loosely mounted upon the shaft, extensions carried by the drums and having indicators connected thereto, a plate pivotally mounted upon the hood of the automobile, means for holding the plate in its neutral position, cords having their upper ends connected to the plate and wound upon the drums, rods slidably mounted upon the chassis, the forward ends of said rods being connected to the lower ends of the cords, a bow pivotally connected to the rear of the automobile, an indicator carried by the bow, said bow having its opposite ends connected to the rear ends of said rods, means carried by the plate for partially rotating the same to operate the drums through the cords to cause the indicators carried by the extensions on said drums to be actuated alternately to cover the lenses of the usual head lights, said cords also serving to operate the rods to direct the indicator carried by the bow in different directions.

In testimony whereof, I affix my signature, in presence of two witnesses.

ROBERT DICKINSON.

Witnesses:
S. A. DICKINSON,
G. T. DEVEREUX.